United States Patent
Kershteyn et al.

(10) Patent No.: US 7,734,126 B2
(45) Date of Patent: Jun. 8, 2010

(54) SYSTEMS AND METHODS FOR CHIRP CONTROL OF A DUAL ARM Z-MODULATOR TO MINIMIZE DISPERSION EFFECT OF FIBER PLANT

(75) Inventors: Boris Kershteyn, Marietta, GA (US); John K. Oltman, Chamblee, GA (US)

(73) Assignee: Ciena Corporation, Linthicum, MD (US)

( * ) Notice: Subject to any disclaimer, the term of this patent is extended or adjusted under 35 U.S.C. 154(b) by 0 days.

(21) Appl. No.: 12/429,493

(22) Filed: Apr. 24, 2009

(65) Prior Publication Data

US 2009/0232512 A1    Sep. 17, 2009

Related U.S. Application Data

(62) Division of application No. 11/732,221, filed on Apr. 2, 2007, now Pat. No. 7,539,359.

(51) Int. Cl.
*G02B 6/12* (2006.01)
*G02F 1/025* (2006.01)

(52) U.S. Cl. .............................. 385/14; 385/3; 359/239; 359/249

(58) Field of Classification Search .................... 385/3, 385/14; 359/239, 249
See application file for complete search history.

(56) References Cited

U.S. PATENT DOCUMENTS

| | | | |
|---|---|---|---|
| 5,875,273 A | 2/1999 | Mizrahi et al. |
| 6,115,403 A | 9/2000 | Brenner et al. |
| 6,381,379 B1 | 4/2002 | Burns |
| 6,742,154 B1 | 5/2004 | Barnard |
| 7,050,666 B2 | 5/2006 | Welch et al. |
| 2001/0013964 A1 | 8/2001 | Alexander et al. |
| 2002/0159119 A1 | 10/2002 | Fries et al. |

*Primary Examiner*—Jerry T Rahll
(74) *Attorney, Agent, or Firm*—Clements Bernard PLLC; Christopher L. Bernard; Tyler S. Brown

(57) ABSTRACT

The present invention provides systems and methods for chirp control of a dual arm Z-modulator to minimize dispersion in the fiber plant. The chirp control is based upon a real-time control loop based upon performance monitoring data between a transmitter and a receiver. Advantageously, the present invention enables improved performance in high-speed optical systems, and in some cases can eliminate or minimize the need for external dispersion compensation fiber (DCF).

7 Claims, 3 Drawing Sheets

SYSTEMS AND METHODS FOR CHIRP CONTROL OF A DUAL ARM Z-MODULATOR TO MINIMIZE DISPERSION EFFECT OF FIBER PLANT

CROSS-REFERENCE TO RELATED APPLICATION(S)

This application is a division of and incorporates by reference in its entirety for all purposes commonly assigned U.S. patent application filed Apr. 2, 2007 now U.S. Pat. No. 7,539,359:

| Pat. No. | Title |
|---|---|
| 11/732,221 | "SYSTEMS AND METHODS FOR CHIRP CONTROL OF A DUAL ARM Z-MODULATOR TO MINIMIZE DISPERSION EFFECT OF FIBER PLANT" |

This application incorporates by reference in its entirety for all purposes commonly assigned U.S. patent issued May 25, 2004:

| Pat. No. | Title |
|---|---|
| 6,742,154 | "FORWARD ERROR CORRECTION CODES FOR DIGITAL OPTICAL NETWORK OPTIMIZATION" |

Furthermore, this application incorporates by reference in its entirety for all purposes commonly assigned U.S. patent application filed Apr. 27, 2001:

| Application No. | Title |
|---|---|
| 2002/0,159,119 | "METHOD AND SYSTEM FOR PROVIDING DISPERSION AND DISPERSION SLOPE COMPENSATION" |

Furthermore, this application incorporates by reference in its entirety for all purposes commonly assigned U.S. patent application filed Feb. 26, 2001:

| Application No. | Title |
|---|---|
| 2001/0,013,964 | "REMODULATING CHANNEL SELECTORS FOR WDM OPTICAL COMMUNICATION SYSTEMS" |

Furthermore, this application incorporates by reference in its entirety for all purposes commonly assigned U.S. Patent issued Sep. 5, 2000:

| Pat. No. | Title |
|---|---|
| 6,115,403 | "DIRECTLY MODULATED SEMICONDUCTOR LASER HAVING REDUCED CHIRP" |

Furthermore, this application incorporates by reference in its entirety for all purposes commonly assigned U.S. Patent issued Feb. 23, 1999:

| Pat. No. | Title |
|---|---|
| 5,875,273 | "LASER WAVELENGTH CONTROL UNDER DIRECT MODULATION" |

FIELD OF THE INVENTION

The present invention relates generally to fiber optics and optical networking. More specifically, the present invention provides systems and methods for chirp control of a dual arm Z-modulator to minimize dispersion in the fiber plant. The chirp control is based upon a real-time control loop based upon performance monitoring data (e.g., bit-error rate (BER) data and the like) between a transmitter and a receiver.

BACKGROUND OF THE INVENTION

Dispersion is a known impairment in optical networks that causes a broadening of optical signals as they travel along the length of the fiber. One type of dispersion is chromatic dispersion (also referred to as "material dispersion" or "intra-modal dispersion"), caused by a differential delay of various wavelengths of light in a waveguide material, i.e. the fiber. Disadvantageously, dispersion has a limiting effect on the ability to transmit high data rates, such as 10 Gb/s and 40 Gb/s. When modulated onto an optical carrier, an optical spectrum is broadened in linear proportion to the bit rate. The interaction of the broadened optical spectrum with wavelength-dependent group velocity (i.e., dispersion) in the fiber introduces signal distortions. The amount of tolerable distortion is inversely proportional to the bit rate. Thus, the combination of increasing spectral broadening and decreasing distortion tolerance makes the overall propagation penalty proportional to the square of bit rate. This results, for example, in a 10 Gb/s signal being 16 times less tolerant to dispersion than 2.5 Gb/s signal, while having only four times the bit rate. Dispersion accumulates linearly with propagation distance in the fiber and typical propagation distances in standard single-mode fiber (e.g., SMF-28 or equivalent) are about 1000 km at 2.5 Gb/s, 60 km at 10 Gb/s, and only 4 km at 40 Gb/s. Existing high-rate optical networks utilize some form of dispersion compensation to obtain meaningful propagation distances at bit rates of 10 Gb/s and above.

Methods to compensate for dispersion include fiber Bragg gratings, optical all-pass interference filters and dispersion compensating fiber. Dispersion compensating fiber (DCF) has found widespread practical acceptance and deployment due to its numerous advantages. Such advantages include relatively low loss and cost and the ability to simultaneously compensate channels across multiple wavelengths in wavelength division multiplexed (WDM) systems without requiring spatial separation. Further, DCF has the ability to compensate for the unavoidable variation in the dispersion as a function of wavelength (second-order dispersion or dispersion slope) that exists in many current transport fibers. Additionally at the individual signal level, dispersion can be pre-compensated utilizing frequency chirp induced by a modulator. Such pre-compensation can lead to reduced requirements for DCF and other external dispersion compensation methods.

High-speed fiber optic transmitters (e.g., 10 Gb/s, 40 Gb/s, etc.) utilize external modulators, such as a Lithium Niobate (LiNbO$_3$) dual arm Z-cut modulators, to improve performance over direct modulators. Advantageously, external modulators allow sophisticated pre-distortion of an optical signal to compensate for dispersion and other non-linear effects experienced during transmission over a fiber. For example, external modulators can induce frequency chirp in the transmitted optical signal. Chirp is the broadening of the optical spectrum under intensity modulation. Chirp is a shift in light frequency (wavelength) as a result of a change in intensity level. Pre-Chirping uses fiber dispersion induced pulse broadening to narrow the pulse to overcome for dispersion experience over fiber transmission. Of note, pre-chirping can be positive or negative. Positively chirped pulses broaden more rapidly than zero chirp, and negatively chirped pulses initially narrow with the higher frequency light catching up. The sign of the chirp is selected according to the fiber plant to properly compensate for the natural broadening of a signal due to dispersion in a fiber by creating a compression effect. Various manufacturers provide fiber plant with different zero dispersion points for optimized transmission. Accordingly, the sign of the chirp is correlated to the zero dispersion point of the fiber plant.

The underlying optical signals include information in a digital format. Such information is typically formatted according to various standards, such as Synchronous Optical Network (SONET), Synchronous Digital Hierarchy (SDH), Optical Transport Network (OTN), and the like. Each standard includes overhead information accompanying data information, and one particular function of the overhead is to provide performance monitoring information. Additionally, such overhead can include Forward Error Correction (FEC) data used to improve optical performance by utilizing mathematical algorithms to proactively correct received bit-errors. For example, one such method of FEC is described in commonly-assigned U.S. Pat. No. 6,742,154 entitled "FORWARD ERROR CORRECTION CODES FOR DIGITAL OPTICAL NETWORK OPTIMIZATION." In addition to optical signal improvement, FEC also provides a real-time metric of signal performance through a calculated bit-error rate (BER).

BRIEF SUMMARY OF THE INVENTION

In various exemplary embodiments, the present invention provides systems and methods for chirp control of a dual arm Z-modulator to minimize dispersion in the fiber plant. The chirp control is based upon a real-time control loop based upon performance monitoring data (e.g., bit-error rate (BER) data and the like) between a transmitter and a receiver. Advantageously, the present invention enables improved performance in high-speed optical systems, and in some cases can eliminate or minimize the need for external dispersion compensation fiber (DCF).

In an exemplary embodiment of the present invention, a chirp control method for chirp control of a dual arm Z-modulator to minimize dispersion in fiber plant includes transmitting an optical signal encoded with a check sequence from a first transmitter to a first receiver over fiber plant, processing the check sequence at the first receiver to determine errors in the optical signal, transmitting a control signal from a second transmitter to a second receiver, wherein the control signal is responsive to the determined errors in the processing step, and adjusting driver gain of the first transmitter responsive to the control signal, wherein a first transceiver includes the first transmitter and second receiver, and a second transceiver includes the first receiver and second transmitter. The check sequence includes one of forward error correction data, parity, and cyclical-redundancy-check. The check sequence is located in overhead of the optical signal. The control signal includes the number of errors received by the first receiver. The control signal is transmitted in overhead of an optical signal transmitted from the second transmitter to the second receiver. The first transmitter is a two-arm modulator with a first and second driver. The adjusting step includes adjusting one of the first and second driver based upon the control signal and a previous adjustment. The difference in value between the first and second driver creates a phase differential in the modulator which introduces chirp into the optical signal.

In another exemplary embodiment of the present invention, a transceiver configured for chirp control of a dual arm Z-modulator to minimize dispersion in fiber plant includes a transmitter configured to transmit an optical signal with modulated data, the transmitter includes a tunable laser connected to a $LiNbO_3$ two arm z-cut modulator, and a positive driver and negative driver connected to the modulator, wherein the positive and negative driver are operable to drive the modulator, a receiver configured to receive a second optical signal with modulated data including a photodetector connected to a de-multiplexer, circuitry connected to the transmitter and receiver configured to transmit and receive data from the transmitter and receiver and to control the transmitter and receiver, wherein the circuitry is configured to add a check sequence which enables a second transceiver to determine errors in the optical signal upon receiving the optical signal, and a control circuit connected to the circuitry, the modulator, and the positive and negative driver, wherein the control circuit is configured to adjust the gain of one of the positive and negative driver responsive to a control signal received by the receiver, and wherein the control signal is transmitted in the second optical signal by the second transceiver and the control signal includes error information for the optical signal transmitted by the transmitter to the second transceiver. The check sequence includes one of forward error correction data, parity, and cyclical-redundancy-check. The check sequence is located in overhead of the optical signal. The control signal includes the number of errors received by a receiver in the second transceiver. The control signal is transmitted in overhead of the second optical signal transmitted from a transmitter in the second transceiver to the receiver. To adjust the gain of one of the positive and negative driver includes adjusting one of the positive and negative driver based upon the control signal and a previous adjustment. The difference in value between the positive and negative driver a phase differential in the modulator which introduces chirp into the optical signal.

BRIEF DESCRIPTION OF THE DRAWINGS

The present invention is illustrated and described herein with reference to the various drawings, in which like reference numbers denote like method steps and/or system components, respectively, and in which.

DETAILED DESCRIPTION OF THE INVENTION

In various exemplary embodiments, the present invention provides systems and methods for chirp control of a dual arm Z-modulator to minimize dispersion in the fiber plant. The chirp control is based upon a real-time control loop based upon performance monitoring data (e.g., bit-error rate (BER) data and the like) between a transmitter and a receiver. Advantageously, the present invention enables improved performance in high-speed optical systems, and in some cases can eliminate or minimize the need for external dispersion compensation fiber (DCF).

Figure 1:
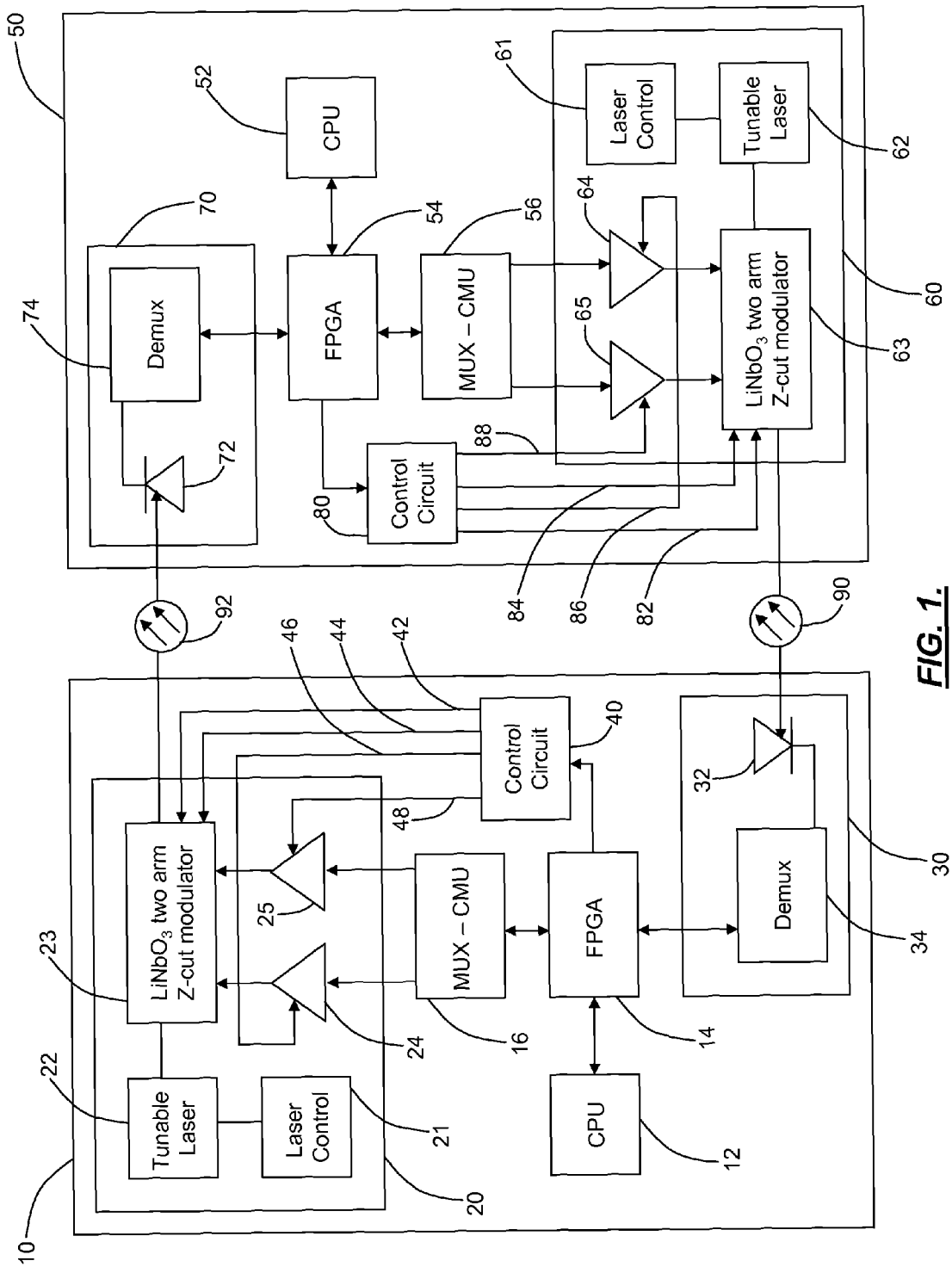
FIG. 1 is a block diagram of a first and second transceiver each including a control circuit operable to perform chirp control of a dual arm Z-modulator to minimize dispersion in the fiber plant, according to an exemplary embodiment of the present invention.

Referring now to FIG. 1, a first transceiver 10 is connected to a second transceiver 50 through optical fibers 90,92. The first transceiver 10 includes a transmitter 20 which is connected through the fiber 92 to a receiver 70 on the second transceiver 50. In the opposite direction, the second transceiver 50 includes a transmitter 60 which is connected through the fiber 90 to a receiver 30 on the first transceiver 10. The transceivers 10,50 are configured to transmit and receive optical signals over the fibers 90,92. These signals are converted from electrical-to-optical on the transmit side, and from optical-to-electrical on the receive side. The transceivers 10,50 can include other components (not shown) to allow communication to a backplane, to a line card, or the like.

The transmitters 20,60 include a laser control 21,61 module, a tunable laser 22,62, a lithium niobate (LiNbO$_3$) two-arm Z-cut modulator 23,63, and modulator drivers 24,25,64,65. The laser control 21,61 module is configured to control the tunable laser 22,62, such as providing current to drive the laser 22,62, setting the output power, and the like. The tunable laser 22,62 provides an output optical signal that is always on at a tunable wavelength. For example, the tunable laser 22,62 can be configured to tune to any wavelength between 1525 nm-1565 nm (C band) or 1570 nm-1610 nm (L band). Also, the tunable laser 22,62 can be compliant to ITU-T G.694.1 frequency grid. The tunable laser 22,62 can include a thermally tuned distributed feedback (DFB) laser, a DFB array, a Vertical-Cavity Surface-Emitting Laser (VCSEL), and the like.

The transmitters 20,60 perform external modulation through the lithium niobate (LiNbO$_3$) two-arm Z-cut modulator 23,63. The LiNbO$_3$ two-arm Z-cut modulator 23,63 is an electro-optic modulator (EOM) that makes use of a LiNbO$_3$ material and a Mach-Zehnder (MZ) interferometer for intensity modulation. Generally, the refractive index of the LiNbO$_3$ material is changed by applying an external voltage. The tunable laser 22,62 is always on providing an optical signal to the modulator 23,63, and the signal is modulated by applying the external voltage to the modulator 23,63. A z-cut LiNbO$_3$ modulator utilizes electrodes placed directly over two waveguides so that the electric field is oriented along the z-axis (relative to the waveguides). The two-arm z-cut LiNbO$_3$ modulator 23,63 is driven by complementary drive signals provided to the modulator 23,63 by drivers 24,25 and 64,65. Each of the drivers 24,25 and 64,65 provides an equal magnitude signal, but with opposite polarity (e.g., drivers 24,25 and 64,65 each have equal magnitude, but opposite polarity). However, the voltage of the drivers 24,25 and 64,65 can be adjusted to induce a differential drive voltage which introduces a differential phase shift between the two waveguides. Accordingly, this differential phase shift can be used to introduce chirp in the optical signal.

The receives 30,70 include a photodetector (PD) 32,72 and a de-multiplexer 34,74. The PD 32,72 receives the optical signal from the transmitters 60,10 and converts the received optical signal into an electrical signal passed to the de-multiplexer 34,74. Typically, the PD 32,72 is wide-band allowing any wavelength between 1525 nm-1565 nm (C band) or 1570 nm-1610 nm (L band) to be detected. The de-multiplexer 34,74 is configured to receive the electrical signal from the PD 32,72, and perform performance monitoring of the received signal and FEC decoding.

The transceiver 10,50 also includes a processor (CPU) 12,52, a field programmable gate array (FPGA) 14,54, a multiplexer/clock multiplier unit (MUX-CMU) 16,56, and a chirp control circuit 40,80. The CPU 12,52 is coupled to the FPGA 14,54, and provides general control of the transceiver 10,50. The FPGA 14,54 connects the CPU 12,52, the MUX-CMU 16,56, and the control circuit 40,80 with the transmitter 20,60 and the receiver 30,70. The FPGA 14,54 and CPU 12,52 can also be connected to an external source (not shown) to transmit and receive data for transmission. Generally, the FPGA 14,54 transmits and receives electrical signals to and from the de-multiplexer 34,74 and MUX-CMU 16,56. Through the FPGA 14,54, electrical signals are provided to the various components in the transceiver 10,50. The MUX-CMU 16,56 is configured to perform FEC encoding, to multiplex multiple electrical signals to a higher speed signal, to provide a clock, and to drive the drivers 24,25 and 64,65 to modulate the modulator 23,63. The drivers 24,64 provide an electrical signal to the modulator 23,63 with a negative value, and the drivers 25,65 provide an electrical signal to the modulator 23,63 with a positive value.

The control circuit 40,80 receives signals from the FPGA 14,54 and connects to the modulator 23,63 and the drivers 24,25 and 64,65. The connections between the FPGA 14,54 and modulator 23,63 include negative bias control connections 42,82 and positive bias control connections 44,84. The bias control connections 42,44,82,84 are used to adjust the bias voltage to the modulator 23,63. The connections between the FPGA 14,54 and the drivers 24,25 and 64,65 include gain control 46,48,86,88. The gain control 46,48,86,88 connections can be used to adjust the positive and negative values provided to the modulator 23,63 by the drivers 24,25 and 64,65. Those of ordinary skill in the art understand that adjusting the gain control gain control 46,48,86,88 and bias control 42,44,82,84 enables varying levels of positive or negative chirp to be introduced into the modulated optical signal.

In an exemplary embodiment of the present invention, chirp control of the two arm modulator 23,63 is provided by changing the signal level of one arm relative to another by controlling the gain of one of the drivers 24,25 and 64,65. As described herein, a different drive level on the two drivers 24,25 and 64,65 to the modulator 23,63 will introduce chirp. Further, chirp of a different sign than the fiber plant will compensate dispersion introduced by the fiber.

Figure 2:
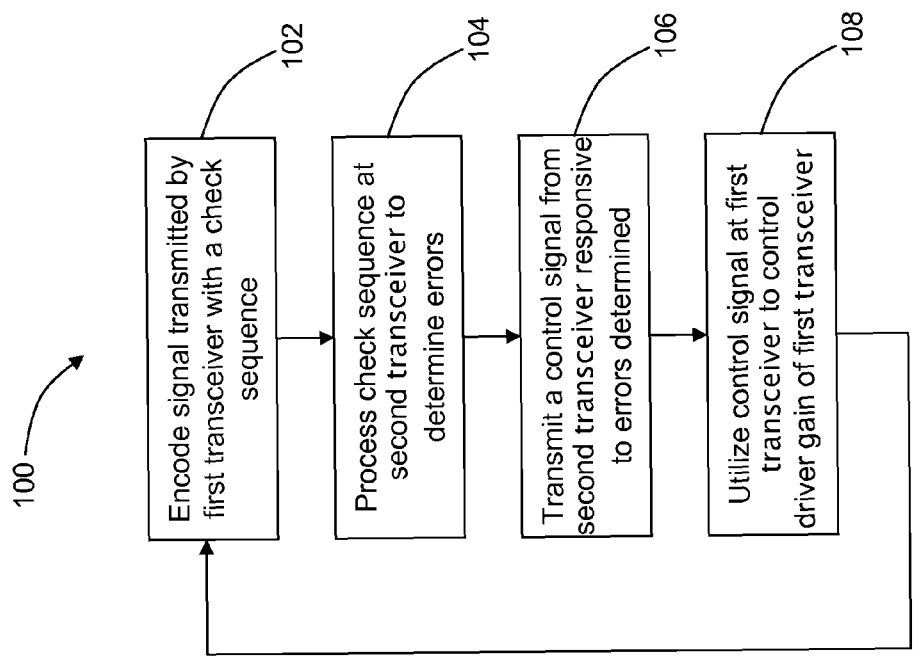
FIG. 2 is a flowchart illustrating an exemplary embodiment of a control method between a first and second transceiver to adjust chirp responsive to a control signal.

Referring to FIG. 2, a flowchart 100 illustrates an exemplary embodiment of a control method between the transceivers 10,50 to adjust chirp responsive to a control signal. The signal modulated and transmitted by the first transceiver 10 is encoded to have a check sequence in the transport overhead such that if an error should occur during transmission over the fiber 92, it can be detected by the second transceiver 50 (step 102). For example, the check sequence can include FEC encoding, parity, cyclical-redundancy-check (CRC), or the like in the overhead of the optical signal transmitted by transceiver 10. Various transmission standards (i.e., SONET, SDH, OTN, etc.) each include mechanisms for detecting bit-errors during transmission between transceivers 10,50. The check sequence can include existing mechanisms, out-of-band FEC, or some other means in the overhead. In one embodiment, the check sequence is put into the modulated optical signal through the MUX-CMU 16,56 in combination with the CPU 12,52 and control circuit 40,80.

The second transceiver 50 processes the check sequence at its receiver 30 to determine if any errors occurred (step 104). For example, the de-multiplexer 74 can perform FEC decoding and track the corresponding errors. Alternatively, SONET/SDH can provide a parity error count based on the SONET/SDH section overhead. Responsive to the detected errors, the second transceiver 50 transmits a control signal to the first transceiver 10 over the fiber 90 (step 106). Here, the transceiver 10,50 utilize the overhead to communicate the error results. This can be through normal data communication channel (DCC) overhead in SONET/SDH, through an out-of-band optical service channel (OSC), or the like.

The first transceiver 10 utilizes the control signal to control the driver gain of its transmitter (step 108). Here, the transceiver 10 receives the control signal at its receiver 30 and processes it through the FPGA 14 and CPU 12. The control circuit 40 then makes appropriate modifications to the drivers 24,25 based upon the control signal. Accordingly, the chirp that the modulator 23 introduces into the optical signal is adjusted based upon the control circuit's 40 adjustment to the drivers 24,25. This forms a control loop which allows the first transceiver 10 to adjust the gain of its drivers 24,25 to minimize the number of errors seen at the second transceiver 50 (i.e., after step 108, the flowchart 100 returns to step 102).

Figure 3:
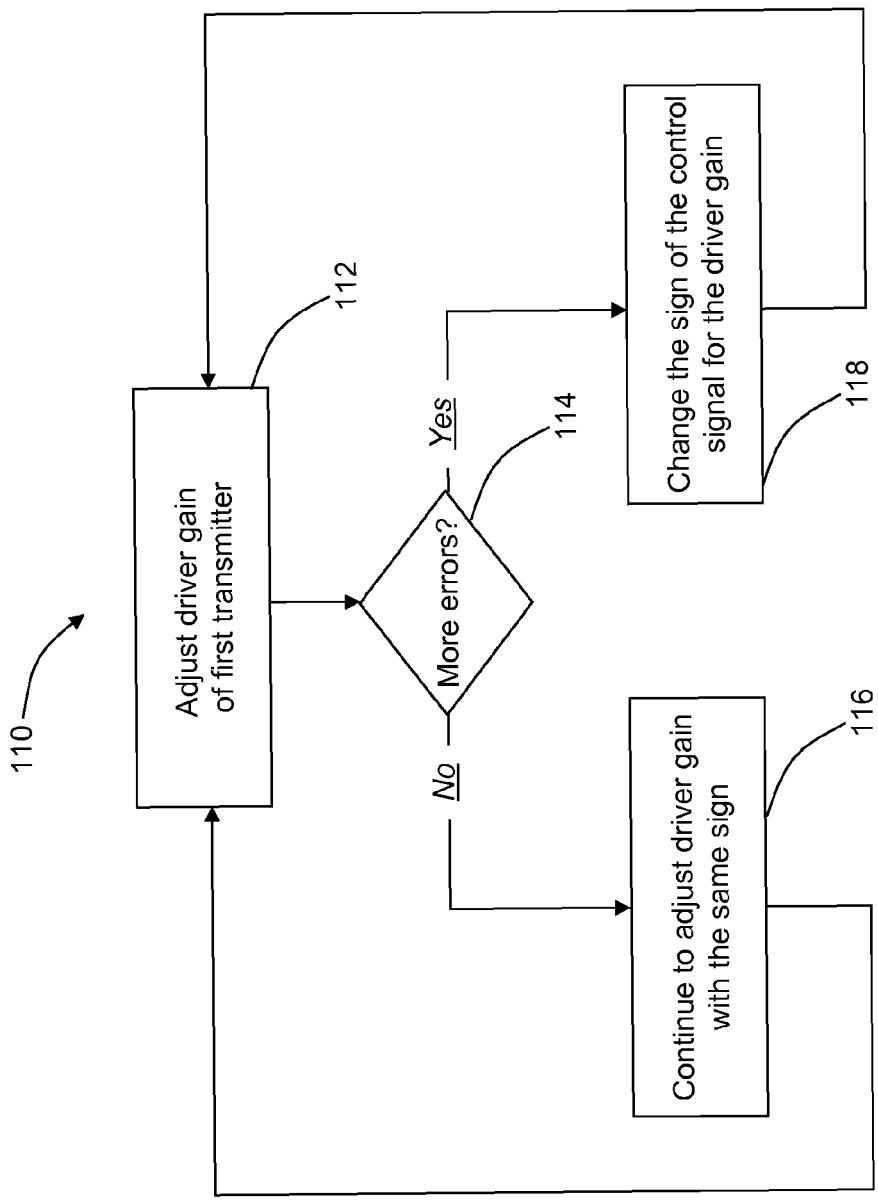
FIG. 3 is a flowchart illustrating an exemplary embodiment of chirp adjustment responsive to errors in an optical signal.

Referring to FIG. 3, a flowchart 110 illustrates an exemplary embodiment of chirp adjustment responsive to errors in an optical signal. The driver 24,25 gain of the first transmitter 10 is adjusted (step 112). Accordingly, the transmitter 20 now transmits to the receiver 70 with the adjustments made to the driver 24,25 gain. The receiver 70 tracks the revised error count and provides an updated control signal back to the first transmitter 10. The revised error count is checked (step 114). If there are not more errors received at the receiver 70, then the control circuit 40 continues to adjust the driver 24,25 gain with the same sign (step 116). Effectively, this means this positive or negative driver 24,25 is increased in value responsive to which one was last updated. If there are more errors received at the receiver 70, then the control circuit 40 changes the sign of the control signal for the driver 24,25 gain (step 118). Here, the control circuit 40 increases in value the positive or negative driver 24,25 where the driver 24,25 increases is the opposite one from the one last adjusted. After steps 116 or 118, the flowchart 110 returns back to step 112, forming a control loop that continuously adjusts the drivers 24,25 responsive to the latest error counts. Advantageously, the feedback loop described above will optimize the gain of the drivers 24,25 for the dual arm modulator 23 to introduce chirp in the modulator 23. The chirp will be controlled to minimize the effect of dispersion in the fiber plant 92.

The control circuit 40 can be implemented in an application specific integrated circuit (ASIC), in discrete components, in a microprocessor/microcontroller, or the like. In one embodiment, the control circuit 40 can update the drivers 24,25 with fixed, incremental changes.

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention and are intended to be covered by the following claims.

What is claimed is:

1. A transceiver configured for chirp control of a dual arm Z-modulator to minimize dispersion in fiber plant, comprising:
   a transmitter configured to transmit an optical signal with modulated data comprising:
      a tunable laser connected to a dual arm Z-modulator; and
      a positive driver and negative driver connected to the modulator, wherein
      the positive and negative driver are operable to drive the modulator;
   a receiver configured to receive a second optical signal with modulated data comprising a photodetector connected to a de-multiplexer;
   circuitry connected to the transmitter and receiver configured to transmit and receive data from the transmitter and receiver and to control the transmitter and receiver, wherein the circuitry is configured to add a check sequence which enables a second transceiver to determine errors in the optical signal upon receiving the optical signal; and
   a control circuit connected to the circuitry, the modulator, and the positive and negative driver, wherein the control circuit is configured to adjust the gain of one of the positive and negative driver responsive to a control signal received by the receiver, and wherein the control signal is transmitted in the second optical signal by the second transceiver and the control signal comprises error information for the optical signal transmitted by the transmitter to the second transceiver.

2. The transceiver configured for chirp control of claim 1, wherein the check sequence comprises one of forward error correction data, parity, and cyclical-redundancy-check.

3. The transceiver configured for chirp control of claim 2, wherein the check sequence is located in overhead of the optical signal.

4. The transceiver configured for chirp control of claim 1, wherein the control signal comprises the number of errors received by a receiver in the second transceiver.

5. The transceiver configured for chirp control of claim 1, wherein the control signal is transmitted in overhead of the second optical signal transmitted from a transmitter in the second transceiver to the receiver.

6. The transceiver configured for chirp control of claim 1, wherein to adjust the gain of one of the positive and negative driver comprises adjusting one of the positive and negative driver based upon the control signal and a previous adjustment.

7. The transceiver configured for chirp control of claim 6, wherein the difference in value between the positive and negative driver a phase differential in the modulator which introduces chirp into the optical signal.

* * * * *